United States Patent [19]

Königs et al.

[11] Patent Number: 4,919,867
[45] Date of Patent: Apr. 24, 1990

[54] METHOD FOR SINTERING HIGH TEMPERATURE CERAMICS

[75] Inventors: Wilhelm Königs; Milan Hrovat, both of Rodenbach, Fed. Rep. of Germany

[73] Assignee: NUKEM GmbH and ALKEM GmbH, Hanau, Fed. Rep. of Germany

[21] Appl. No.: 118,035

[22] Filed: Nov. 9, 1987

[30] Foreign Application Priority Data

Dec. 3, 1986 [DE] Fed. Rep. of Germany ....... 3641253

[51] Int. Cl.$^5$ ............................................. C04B 35/64
[52] U.S. Cl. ........................................ 264/57; 264/56; 414/151
[58] Field of Search ..................... 264/57, 56; 414/151

[56] References Cited

U.S. PATENT DOCUMENTS 2,271,091  1/1942  Pecker et al. ..................... 414/151

FOREIGN PATENT DOCUMENTS 61-117165  6/1986  Japan ..................................... 264/57

Primary Examiner—James Derrington
Attorney, Agent, or Firm—Cushman, Darby & Cushman

[57] ABSTRACT

A method and a device for sintering ceramic shaped articles in a furnace which saves costs and energy but provides high throughput. To this end, the shaped articles are guided vertically through the furnace on the helical rib of a stationary, vertically positioned helix by the inner longitudinal ribs of a rotating, vertically standing tube which concentrically surrounds the helix.

1 Claim, 1 Drawing Sheet

METHOD FOR SINTERING HIGH TEMPERATURE CERAMICS

The present invention relates to a method for continuously sintering shaped ceramic articles in a furnace as well as to a furnace for carrying out this method.

BACKGROUND OF THE INVENTION

Shaped articles composed of high-temperature ceramics, that is, of high-melting ceramics, are manufactured from oxides, carbides or nitrides e.g. of the elements uranium, plutonium, gadolinium, silicon, titanium, niobium, zirconium or molybdenum. These articles are made by pressing and are finally compressed by sintering at high temperatures, primarily above 1600° C. The sintering process normally is carried out by hot pressing in furnaces. The furnaces may be operated batchwise, but primarily they are continuously operating horizontal pusher-type sintering furnaces. These furnaces are electrically heated. The furnaces may be operated under vacuum or with a protective gas atmosphere, depending on the sintering material. In continuous furnaces, the sintering material itself is carried in socalled sintering boats of e.g. tungsten which are pushed linearly through the furnace.

These horizontal pusher-type sintering furnaces have various disadvantages with respect to their construction and method of operation. They require a large furnace volume, which leads to long heating-up and cooling-down times. In addition, they require a large amount of space. Further, the operation is not truly continuous because of the interruptions caused by loading and unloading of the sintering boats.

Other problems arise because the sintering boats, which contain the sintering material, must also be heated up and cooled off, which increases energy costs. In addition, the necessary numerous sintering boats require a large outlay of capital.

SUMMARY OF THE INVENTION

The object of the present is to provide a method for the continuous sintering of shaped ceramic articles in a furnace which requires little time, energy and space as well as eliminating the expensive sintering boats, but which allows a high throughput.

In accordance with the present invention, the shaped articles are guided vertically through a furnace in a helical path along a stationary, vertically positioned helix by means of the inner longitudinal ribs of a rotating, vertically positioned tube which concentrically encloses the helix. The sintering time is controlled by regulating the speed of rotation of the tube and/or by the geometry of the helix.

The present invention also provides a furnace for carrying out the method of the invention. The furnace comprises a vertically positioned, rotatable tube which has vertically extending inner longitudinal ribs and a stationary helix which is concentrically located within the tube. The helix closely fits the longitudinal ribs. Thus conduits are formed between the longitudinal ribs of the tube and the helix. The geometry of the cross section of the ribs is designed and dimensioned in such a manner that it corresponds with the width of the helix and its pitch and to the cross section of the shaped ceramic articles plus some space for necessary free play.

It is preferable if the furnace comprises a device for feeding individual shaped articles onto the top of the helix.

It is also advantageous if the tube and the helix are replaceable so that the furnace may be used for articles which have a variety of sizes and shapes.

It is furthermore preferred that the furnace is provided with a removable conduit with a funnel-like entrance at the lower end of the furnace to receive the sintered shaped articles released by the lower end of the helix.

BRIEF DESCRIPTION OF FIGURES OF DRAWING

In the drawing:

FIG. 1 is a schematic vertical cross-section of a furnace according to the invention taken along lines 1—1 of FIG. 2; and FIG. 2 is a schematic horizontal cross-section of the furnace according to the invention.

DETAILED DESCRIPTION OF PREFERRED EMBODIMENT

The method of the invention and the furnace for carrying out this method will be explained in more detail with reference made to the drawings.

Figure 1:
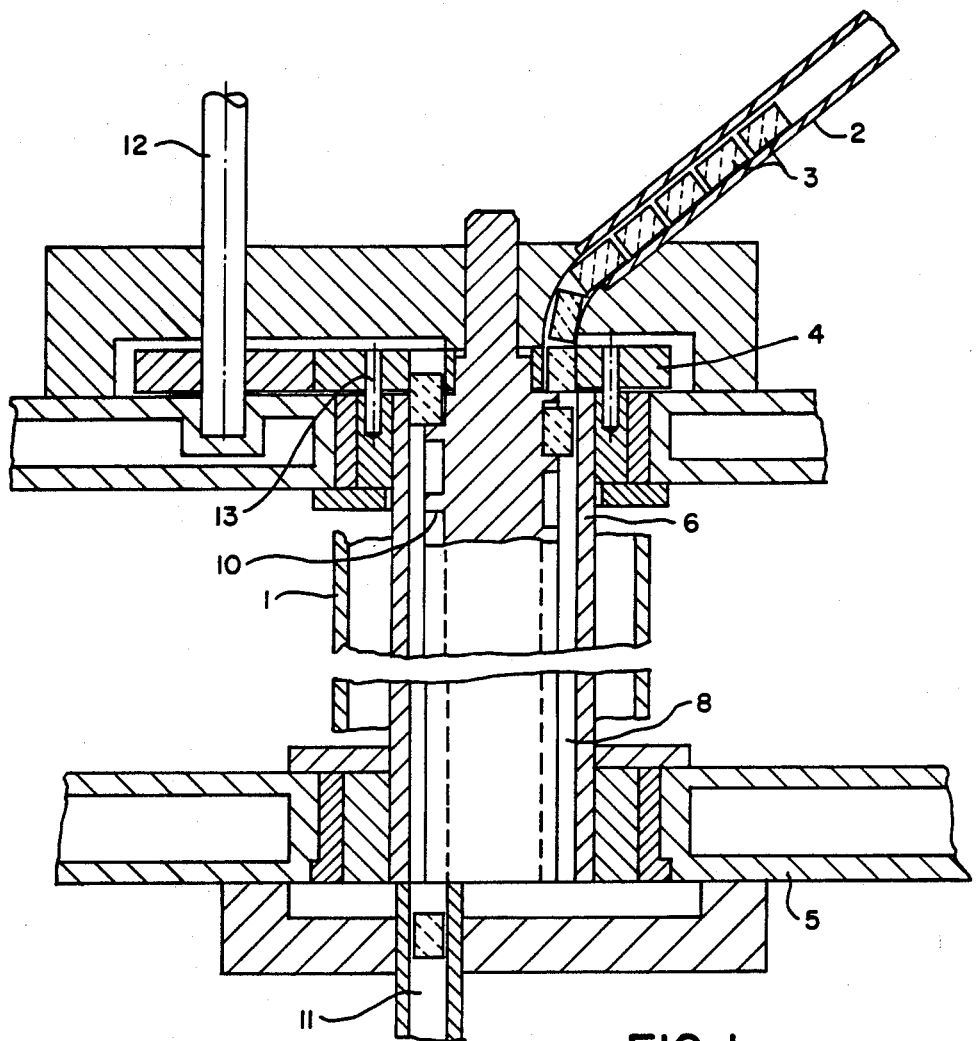
Figure 2:
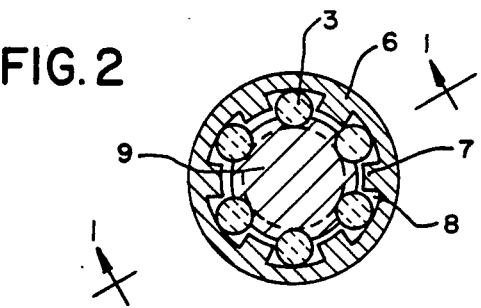

As shown in FIG. 1, the shaped articles 3 to be sintered, e.g., articles which are ball-shaped, plate-shaped, cylindrical or which exhibit any other shape and consist of high-melting ceramic materials such as oxides, carbides or nitrides, are arranged with axial orientation and supplied through an entrance tube 2 at the upper end to a vertically positioned furnace 1. The shaped articles 3 pass individually via an automatically operating feeding device 4 into conduits 8 which are formed by the inner longitudinal ribs 7 of a rotatable tube 6. The tube 6 is rotated by drive 5. Each formed body 3 is supported on a rib 10 of a stationary helix 9 which is positioned concentrically within tube 6. Stationary helix 9 is positioned as close as possible to longitudinal ribs 7 of the tube 6, that is, only a small clearance space remains which is sufficient for any permissible rotary motion of tube 6, taking into account thermal expansion and other tolerances.

The geometry of the cross section of the conduits 8 formed between the longitudinal ribs 7 is designed and dimensioned in such a manner that its width, together with the width of the opposite corresponding rib 10 of helix 9 and its pitch, allows space for the cross section of the shaped article 3 plus any necessary space for free play. Thus, each shaped article 3 has the space necessary for its travel through the furnace. A sufficient part of its width is effectively supported on the rib 10 of the helix 9, and it is guided by the rotary motion of the tube 6 on helix 9 in a spiral and a vertical path though the furnace and the associated temperature and sintering zones. The rotary motion of the tube 6 is transmitted by means of the ribs 7 to the shaped articles 3. During the vertical spiral passage of each shaped article 3 through the sintering furnace, its own gravity, frictional forces and the torque exerted on it via the longitudinal ribs 7 affect it. This action guarantees a careful transport of the shaped articles through the furnace, even in the state which is not yet sintered, in which state, therefore, the final properties of the formed bodies (final density, porosity, strength, closed geometry, among others) have not yet been achieved. The position of the shaped articles in relation to the longitudinal furnace axis remains constant during their entire transport procedure in the sintering furnace through the temperature profile which has been established. The sintering time and, depending on the case, the shaped article throughput, can be regulated via the speed of rotation of the tube 6 and/or via the geometry of the helix 9 as a function of the temperature program, selected in cooperation with the furnace heating circuits and, optionally, with the furnace atmosphere.

It is advantageous to use replaceable tubes 6 and helixes 9, to be able to accommodate the geometry of a variety of shaped articles. Depending on the case, the furnace can be changed to accept a different shaped article by changing the distribution or the width of the ribs 7 of the tube 6 and by changing the width or pitch of the ribs 10 of the helix 9.

Upon reaching the helix end, the sintered shaped articles 3 fall out of furnace 1. It is advantageous to provide a removal conduit 11 at the lower end of the furnace which receives the articles as they drop off the helix in a careful and orderly fashion. Subsequently, the sintered shaped articles are fed to further treatments (e.g. grinding, quality check) and processing.

If the sintering is performed in a special gas atmosphere (e.g. argon or hydrogen), then the shaped articles are moved in and out of the furnace via known lock devices.

The feeding device 4 is driven by drive 12 and connected via dogs 13 to tube 6. The feeding device is a disk which has bores to receive individual ceramic articles. It can have as many bores for the shaped articles as there are conduits 8 on the inside of tube 6.

The furnace of the invention can also be used as a tempering furnace, e.g. for a subsequent treatment of shaped articles of a suitable geometry according to the so-called hot strike compression.

Tube 6 and helix 9 are manufactured to accommodate the high furnace temperatures, which can be over 1600° C. in the sintering zone. It is made from materials resistant to high temperatures.

The space required for the furnace is very small. Only small amounts of energy are required for high throughputs and the furnace capacity can be optimally utilized.

The following examples illustrate the invention in more detail:

EXAMPLE 1

Cylindrical uranium oxide ($UO_2$) briquettes which had a diameter of 7.8±0.1, a length of 10.5±0.5 and a pressing density of 6 $g/cm^3$ are sintered in a high-temperature furnace 1 which was 350 mm wide, 350 mm deep and 500 mm high in accordance with FIG. 1. To this end, columns of briquettes 3 with a length of 300° mm are transported by a conveyor into a double-chamber lock constructed over the furnace. After the lock has been evacuated and flooded with furnace gas ($Ar/H_2$ in a ratio of 96/4), the horizontally stored briquettes 3 are pushed into a tube inclined 38° to the horizontal which had a diameter of 8 mm. The briquettes 3 slide individually and carefully into the vertically positioned sintering furnace 1 to feeding device 4. There, they stack up again into columns. Feeding device 4 is located at the top in the cold area of high-temperature sintering furnace 1 and consists of a rotating disk 80 mm in diameter with 8 bores concentrically arranged around the center of the disk, each of which had a diameter of 8.5 mm. The centers of the bores are located 15 mm from the center of the disk.

The briquette located in the feeding disk is supported to the extent of half its diameter on the stationary helix rib. Tube 6 is located under the feeding device. The 8 longitudinal conduits 8 (width =8.5 mm, depth =4 mm) of the tube 6 are exactly aligned with the bores in the feeding disk in order to prevent the briquettes 3 from jamming. While tube 6 and the individualizing disk rotate in synchronism, each briquette 3 slides, supported on helix rib 10, through the high-temperature sintering furnace 1. Each briquette 3 is pushed individually through high-temperature furnace 1 by means of longitudinal ribs 7 between conduits 8.

The pitch of helix 9 is 15 mm of which 3 mm is allotted to the rib height and 12 mm to the free space between the individual ribs.

Helix 9 is made of tungsten and has a core diameter of 22 mm and an outer diameter of 29.5 mm. Tube 6, which is also made of tungsten, has an inner diameter of 30 mm, an outer diameter of 44 mm and a conduit depth of 4 mm.

A free play of 0.5 mm was provided between helix 9 and the ribs of tube 6 in order to avoid friction between the helix and the tube.

The temperature profile in high-temperature sintering furnace 1 is set by 6 heating zones in such a manner that the tablets are heated up from room temperature to 1500° C. at approximately 30° C./sec and from 1500° C. to 2200° C. at approximately 45° C./sec at a speed of 7.5 revolutions per minute of the tube.

The briquettes remain in the high-temperature zone of 2200° C. for approximately 30 sec and are then transported into the cooling zone.

The briquettes cooled down to room temperature are then conveyed into a removal conduit 11 inclined 38° to the horizontal with a diameter of 8 mm. This occurs as follows: The helix rib ends in front of the removal conduit 11 and the briquettes 3 loose their support. During the sintering process, the briquettes shrink from a diameter of 7.8 mm to a diameter of 7.2 mm and change to a density of approximately 10.4 $g/cm^3$. The briquettes remain fixed during the entire transport process with their longitudinal axis parallel to the longitudinal axis of the helix or of the tube.

A speed of 7.5 revolutions per minute, that is, 1 briquette/sec, results in a daily throughput of approximately 75 kg $UO_2$ briquettes at approximately 2.6 g/briquette.

EXAMPLE 2

Aluminum oxide balls with the diameter of 7.5 mm are sintered in a high-temperature sintering furnace according to example 1.

A speed of 7.5 revolutions per minute and an availability of 80% results in a daily throughput of approximately 53.4 kg.

EXAMPLE 3

$UO_2$ platelets with dimensions of 20×20×5 mm were sintered in a furnace according to FIG. 1.

The helix 9 had a core diameter of 50 mm and an outer diameter of 58 mm. The pitch of this helix was 25 mm. Of this amount, 4 mm was allotted to the rib height and 21 mm to the interval between the ribs.

Concentrically positioned tube 6 comprised 6 longitudinal conduits 8 for receiving and transporting the $UO_2$ platelets.

The outer diameter of tube 6 was 76 mm and its inner diameter 58.5 mm. 6 longitudinal conduits 21 mm wide and 3.5 mm deep were formed in the tube by means of the longitudinally extending ribs 7.

The high-temperature sintering was carried out in a manner analogous to Example 1.

A speed of 7.5 revolutions per minute and the same availability resulted in a daily throughput of 1653 kg.

What is claimed is:

1. A method for the continuous sintering of ceramic shaped articles in a furnace which comprises guiding the shaped articles vertically through a furnace along a helical rib of a stationary, vertically positioned helix by rotating a tube around and adjacent to the helix, the tube being provided with vertically-extending longitudinal ribs and providing heat to the furnace, the sintering time being regulated by the rotation speed of the tube and/or by selecting a replaceable helix to provide the desired sintering time.

* * * * *